United States Patent [19]
Jalan et al.

[11] Patent Number: 5,607,784
[45] Date of Patent: Mar. 4, 1997

[54] HYDROGEN/FLUORINE POWER GENERATING SYSTEM

[75] Inventors: Vinod Jalan, deceased, late of Concord, by Radha Jalan, executrix; Mahesh N. Desai, Norwood; Derek A. Johnson, Jefferson, all of Mass.

[73] Assignee: ElectroChem, Inc., Woburn, Mass.

[21] Appl. No.: 375,528

[22] Filed: Jan. 19, 1995

[51] Int. Cl.$^6$ .................................................. H01M 8/14
[52] U.S. Cl. ............................. 429/16; 429/46; 429/103; 429/199
[58] Field of Search ............................. 429/16, 96, 101, 429/103, 191, 199

[56] References Cited

U.S. PATENT DOCUMENTS

| | | | |
|---|---|---|---|
| 3,575,717 | 4/1971 | Juda et al. | 429/16 |
| 4,128,701 | 12/1978 | Maricle | 429/101 X |
| 4,367,267 | 1/1983 | Oi | 429/191 X |
| 4,851,303 | 7/1989 | Madou et al. | 429/191 X |

*Primary Examiner*—Stephen Kalafut
*Attorney, Agent, or Firm*—Bruce F. Jacobs

[57] ABSTRACT

A $H_2/F_2$ power generating system is disclosed. The system is particularly useful in producing power in military and space vehicle applications because of its high energy density and long shelf life.

14 Claims, No Drawings

HYDROGEN/FLUORINE POWER GENERATING SYSTEM

U.S. GOVERNMENT RIGHTS

This invention was developed under Dept. of Air Force Contract No. F33615-90-C-2076 and the U.S. Government has certain rights hereto.

BACKGROUND OF THE INVENTION

The requirements for onboard strategic and tactical missile power systems are complex. The most significant requirements are ultra-high energy density, the capability of operating between about −50° and about +75° C., initiation without an external heat source with about 1 second or less delay from initiation to full load, and a shelf life of at least about 25 years.

Among the pulse batteries under development, the current state-of-the-art lithium systems have become very attractive, because of their energy density. Several types of batteries appear to be of practical interest. Recent years have seen a fast pace in the research and development of promising pulse batteries. Lithium-thionyl chloride batteries designated as RLI/SOCL$_2$ are presently used as a power source for missile and other military weapon applications. The theoretical energy density of an Li/SOCl$_2$ battery is 1600 WH/Kg; with a theoretical cell voltage of 3.1 volts.

Watanabe, N. T., T. Nakajima, and H. Touhara, Graphite Fluorides, Elsevier (1988) discloses a Li/(CF) power system. Its energy density is, however, much too low for on-board power for missile operations. H$_2$/O$_2$ fuel cells and H$_2$/Br$_2$ fuel cells are not yet fully developed and also appear to exhibit too low an energy density.

An object of the present invention is to develop a battery that is capable of meeting the specific energy requirements for use generating strategic and tactical onboard power for missile and other high energy density applications.

Another object of the invention is to produce a power source that has a substantially indefinite shelf life, yet is capable of a quick start-up under a variety of conditions.

DISCLOSURE OF THE INVENTION

Accordingly, the present invention is directed to a power generating system, particularly a fuel cell system, comprising a source of hydrogen and a source of fluorine and means for utilizing the sources of fluorine and hydrogen to produce power. Generally, the means for utilizing the sources of hydrogen and fluorine comprises an electrode assembly and a current collector for collecting power generated during the operation of the system. The electrode assembly comprises a hydrogen anode and a fluorine cathode with an electrolyte disposed between the two electrodes. The electrolyte composition is selected such that it is solid and porous until activated during operation of the device. The preferred electrolyte is KF.xHF impregnated into a separator layer of a matrix material.

Hydrogen and fluorine are stored separately. They are introduced into the device and combine in the pores of the KF.xHF electrolyte matrix. The hydrogen and fluorine react, with or without a catalyst, to form HF which increases the HF concentration in the electrolyte, lowers the melting point of the KF.xHF electrolyte, and yield heat (reaction exothermic) to produce a molten electrolyte. The hydrogen/fluorine system begins operating once the electrolyte is molten. Fluorine is electroreduced at the cathode to fluoride ions which travel across the electrolyte and react with hydrogen to produce hydrogen fluoride which flows out of the anode cavity with some excess hydrogen, which is either vented to the atmosphere or absorbed with, a suitable material such as NaF.

The power producing system of the present invention has an extremely high energy density which is over twice the energy density of a Li/SOCl$_2$ fuel cell and produces 2 volts of power. The triple reserve nature of the device translates to a power system with a relatively long shelf life of greater than 25 years. The power producing system may be activated at any temperature down to about −188° C. (the liquidus temperature of fluorine) and operates at any temperature in the range in which the electrolyte remains molten (i.e. about −10° to about 250° C., depending on the value of x in KF.xHF. The start-up time of the fuel cell is very fast in comparison to thermal and/or reserve batteries, generally less than about 1 second. The power producing system of the present invention is particularly useful in tactical missile power, military space power and portable weapon systems.

BRIEF DESCRIPTION OF THE DRAWINGS

FIG. 1 is a sectional view of a power generating system according to the present invention.

FIG. 2 is a perspective view of the power generating system of FIG. 1.

FIGS. 3–9 are graphs showing the test results of the fuel cell power generating systems of Examples 3–7.

DETAILED DESCRIPTION OF THE PREFERRED EMBODIMENTS

Referring to the drawings, the power generating system according to the present invention will now be described with reference to a fuel cell which is shown in FIGS. 1 and 2. As shown the fuel cell 10 comprises current collector plates 12 and 14 having gas plenums 13 and 15 and gas inlets 16 and 18. Disposed between the collector plates 12 and 14 is an electrode assembly 20 which is shown in a perspective view in FIG. 2. The electrode assembly 20 comprises a fluorine cathode 22, a hydrogen anode 24 and an electrolyte separator 26 disposed between the cathode and anode. Cathode and anode gaskets 28 and 30, respectively, in combination with face gasket 29 physically and electrically isolate the anode and cathode chambers within the current collector plates 14 and seal the cell. Face gasket 29 particularly serves to seal the anode and cathode electrodes. The source of fluorine gas is shown at 32 and the source of hydrogen gas is shown at 34. The supply of the fluorine and hydrogen gases is regulated by means of control valves 36 and 38 which may be controlled by suitable and conventional means.

The current collector plates 12 and 14 must be made out of electrically conductive and chemically resistant materials. The plates must be chemically resistant to fluorine and hydrofluoric acid. Suitable materials include Fe, steel, Ni, Al, monel, Cu, Mg alloys, and Ag. Aluminum and copper are presently the more preferred materials, with copper being the most preferred. The current collector plates are machined from blanks of metal. Plate 12 is machined to have an anode chamber and plate 14 is machined to have a cathode chamber.

The electrode materials that are employed may be any of those used in the electrolysis of HF to produce fluorine. Thus, the anode generaly comprises an electrocatalytic metal such as platinum, silver, steel or nickel, disposed on a suitable substrate. Platinum is presently the most preferred metal. The metals are generally dispersed in amounts of about 10 to 20 wt % upon carbon particles. The cathode comprises an electrocatalyst such as non-graphitized carbon powder such as Vulcan XC-72, BlackPearl 2000, or derivatives thereof on a suitable substrate. Suitable substrates include carbon fiber paper, nickel exmet (nickel expanded metal), graphite cloth, graphite felt, woven wire cloth, porous polymers, woven polytetrafluoroethylene cloth, and the like. The electrocatalyst is preferably added to a conventional binder such as polytetrafluoroethylene (PTFE) or fluorinated ethylene-propylene polymers (FEP) which form porous gas diffusion layers which are then bonded to the substrate.

The electrodes contain electrocatalyst in an amount of from about 5 to 10 mg/cm$^2$, more preferably in an amount of from about 2 to 5 mg/cm$^2$. The amount of electrocatalyst may be larger or smaller than the above ranges if desired and depending upon the particular electrocatalyst and substrate employed. Selection of suitable amounts of electrocatalyst for a particular operation is within the skill of the art.

While any conventional electrode fabrication process may be employed, a particularly preferred process is set forth hereinafter. To accomplish electrode fabrication, a slurry of electrocatalyst is sonicated and stirred while the appropriate quantity of a polytetrafluorethylene (PTFE) suspension, generally containing PTFE, water, and a suitable emulsification agent, is added. The pH of the solution is adjusted, generally to about 3 to 3.5, while stirring to promote flocculation and electrocatalyst/PTFE agglomeration. The solution is then allowed to sit undisturbed until flocculation is verified. Flocculation is verified by the segregation of the solution into two layers, a catalyst-PTFE slurry and a clear supernatant, and is caused by the binding of PTFE to the carbon particles upon which the catalytic metals had been deposited. The resulting slurry is stirred and cast onto glazed paper, which is conventionally used in electrode manufacture, by vacuum filtration. The PTFE-bonded catalyst layer is then transferred from the paper to an electrode substrate, such as wetproofed carbon fiber paper (e.g. Stackpole Co. type PC-206 or TORAY), by rolling, pressing, and heating. Wetproofed carbon fiber paper is generally prepared by immersion of carbon paper into a fluorocarbon suspension, followed by drying and sintering of the paper. The electrode is then dried and sintered. Sintering refers to the change that the PTFE undergoes when heated to its softening temperature: the PTFE flows over the supported catalyst to form the hydrophobic gas diffusion structure. The electrode is now ready for use.

The electrolyte comprises a salt having the formula KF.xHF wherein x at least about 1, preferably about 2 to about 8, most preferably from about 2 to about 5. When X is about 2 or more the melting point of the salt will be greater than the upper limit of the expected ambient temperature range of HF. The KF.xHF salt is impregnated into a porous inert and electronically insulating separator layer composed of a matrix material to form the electrolyte layer, which is disposed between the anode and cathode. The separator may be formed from any suitable material such as a PTFE woven fabric or any other material which is chemically inert to the system, electronically non-conductive, and also wet easily in the electrolyte. A porous PTFE cloth such as a polytetrafluoroethylen fabric sold by Stern & Stern Textiles is presently the most preferred material. The electrolyte layer is prepared by crystallizing the appropriate electrolyte salt from a melt onto the separator material under an inert dry atmosphere. The electrolyte is preferably applied to both sides of the separator. The thin electrolyte layer may also be on a catalyst layer or electrode to aid the reaction of the H$_2$ and F$_2$ gases. Suitable catalysts include a platinum electrode for H$_2$ and a carbon electrode for F$_2$. The catalysts are preferably present in amounts of from about 5 to 10 mg/cm$^2$.

In an operating cell, the electrolyte will be formed by either the reaction of KF.xHF with HF (after the HF is formed by the reaction of H$_2$ and F2, liberating heat) or by the use of KF.x2HF initially which will melt when HF is produced. The quantity of H$_2$ and F$_2$ required to produce the heat required can be introduced upon initiation so that the cell comes to full load as rapidly as possible. The cell reactions are fluorine reduction at the cathode and H$_2$ oxidation and HF formation at the anode. The current carrying species contains fluoride, possibly HF The HF produced will in part be dissolved in the electrolyte.

The gaskets, which physically and electrically isolate the anode and cathode chambers and seal the cell, are made from any suitable material which accomplishes this isolation. Presently, the preferred material is PTFE. The gaskets are hot pressed and then cut to size. The thickness of the gaskets will depend upon the thicknesses of the electrolyte layer, the anode and cathode.

The remaining components of the system include pressurized storage containers for the hydrogen 36 and fluorine 38 gases. The containers may be made from any suitable materials which are normally used in pressurized applications. The introduction of the gases to the fuel cell 10 is regulated by control valves 34 and 36, which are preferably solenoid valves. Suitable flow meters (not shown) and pressure regulators (not shown) may also be used. An electrolyte reservoir (not shown), e.g. a small cavity outside of the pegs or grooves of the current collector plates through which molten electrolyte may flow via capillary action into the electrode assembly. All surfaces in contact with F$_2$ gas, including the container 38, valve 34 and connecting piping, must be thoroughly cleaned, dried and passivated.

In operation, hydrogen and fluorine gases from container 36 and 38, respectively, are fed to the fuel cell 10. Hydrogen and fluorine combine in the pores of the electrolyte layer. Preferably, with the aid of a catalyst contained in the electrolyte layer, H$_2$ and F$_2$ react to form HF. The reaction that takes place is exothermic and the heat released from the reaction melts the KF.xHF electrolyte layer thereby generating molten electrolyte. Alternatively, the molten electrolyte is formed by the reaction of KF.HF with HF, which is first formed by the reaction of H$_2$ and F$_2$. No matter which mode of electrolyte formation occurs, the HF formed during this process may combine with the electrolyte which still remains molten. The fuel cell begins to operate as soon as the electrolyte becomes molten. Fluorine is electroreduced at the cathode to fluoride ions which are transported across the electrolyte and react with hydrogen at the anode to produce HF and power. The HF which flows out of the anode cavity in the collector plate 14 with some excess hydrogen is either vented to the atmosphere or absorbed, for example, with NaF.

The reaction at the cathode is:

$$F_2 + 2e^- \rightarrow 2F^-$$

The reaction at the anode is:

$$H_2 + 2F^- \rightarrow 2HF + 2e^-$$

The net reaction therefor is:

$$H_2 + F_2 \rightarrow 2Hf.$$

The standard electrode potential for this reaction is 2,876 volts. The theoretical maximum energy density of the H$_2$/F$_2$ power device of the present invention is 3730 Wh/kg as compared to the 1600 Wh/kg maximum energy density of a Li/SOCl2 device.

One possible design for a fuel cell system according to the present invention is set forth hereinafter. Table 1 shows the results of a design for a 2.2 kW system running for 1 hr. The weight of the fuel cell is 10 kg having an output voltage of 24 volts with operating current density of 10,000 mA/cm$^2$. The expected single cell voltage is 2.5 V. The area of the cell stack is determined from the current and power densities plus an allowance for 1 cm of edge seal on all sides.

The thickness of the stack is based on the number of cells and a thickness per unit cell based on similar designs for $H_2/O_2$ fuel cells with an allowance for the additional thickness of the endplates. The weight and volume of the stack calculated based on these dimensions, the density of the cell blocks (using copper), and an assumed void volume (40%). The weight of reactants is determined by faradaic relationship. Thus, of the 10 kg allowed for this system, the cell stack and reactants weigh only 1.2 kg. Light weight aluminum storage tanks for high pressure fluorine and reinforced plastic tanks for hydrogen (as used for space shuttle applications) provide a weight for the complete system of less than 10 kg.

TABLE I

Design for 2.2 kW System Operating for 1 hour
(Permissible Weight 10 Kg)

| System Voltage | 24 | Volts |
|---|---|---|
| System Power | 2200 | Watts |
| Single Cell | 2.5 | Volts |
| Current Density | 10,000 | mA/cm$^2$ |
| Power Density | 25 | W/cm$^2$ |
| Active Area No | 88 | cm$^2$ |
| No. Cells | 10 | |
| Cell Stack Area | 24.7 | cm$^2$ |
| Stack Thickness | 3 | cm |
| Stack Volume | 74 | cm$^3$ |
| Stack Weight | 311 | gm |
| F2 needed | 16.4 | moles/hr |
|  | 624.0 | gm/hr |
| H2 needed | 16.4 | moles/hr |
|  | 32.8 | gm/hr |
| Total Energy | 8,938 | kJ/hr |
| Electrical Energy | 7,920 | kJ/hr |
| Net Heat Rejection | 1,018 | kJ/hr |

EXAMPLES

Each test cell as described in the following specific Examples comprises two machined current collector copper plates with gas chambers, fluid plenums, and fittings. The current collector plates are similar to the cell blocks used for other electrochemical cells, i.e.; a flat plate with the center machined with pegs or grooves to provide a gas chamber and with inlet/outlet ports using standard fittings. For this cell, an electrolyte reservoir was not required, which simplifies the design. The collector plates along with electrode assembly with PTFE gaskets are contained using insulated tie bolts. The electrodes used were porous PTFE-bonded gas diffusion type produced in accordance with standard procedures used for both phosphoric acid and alkaline fuel cell electrodes.

Prior to start up, the system was thoroughly cleaned, degreased, dried, and flushed with nitrogen, before the oxidant side of the process was passivated by exposure to $F_2$. The cell was assembled with a cell package and placed on the test stand. The fuel and oxidant inlet and outlet lines were connected to anode and cathode fittings, respectively.

Nitrogen was purged through the anode and cathode lines with cell at open circuit. The cell was heated to approximately 65°–70° C. using resistive heating pads mounted on the current collector plates. The plates had thermocouples for measuring cell temperature. After the cell had equilibrated and the electrolyte liquefied sealing the anode and cathode chambers, $H_2$ and $F_2$ were introduced at low flows, i.e. 50–60 cc/min for the hydrogen and 30–40 cc/min for the fluorine. The cell was allowed to stabilize at open circuit voltage. With reactants present, a resistive load was placed across the cell and power was drawn. In the cells of Examples 3, 4, 5, 6, and 7, after the cell was purged with $N_2$, the $H_2$ and $F_2$ gases were started at room temperature. Once the open circuit voltage was stabilized, the cell was put on load at 500 mV potential. The cells were run for 2–3 hours and cell performance was measured at different temperatures. A computer-interfaced data acquisition and control system was used for controlling the cell current. The system monitored and recorded all cell operating parameters, e.g. current, voltage, temperature, etc.

The exhaust from the cell contained $H_2$, HF, and some $F_2$. The exhaust was scrubbed prior to venting using soda lime to remove $F_2$ and using NaF to remove HF.

After a test was completed, the system was flushed extensively with dry nitrogen prior to tearing down the cell for post-test examination.

In the Examples, Vulcan carbon powder is a non-platinized carbon powder available from Cabot, Corp; PC-206 carbon paper is a carbon fiber paper available from Stackpole Company, St. Mary's, Pa.; T216-38 Teflon Cloth is woven poly(tetrafluoroethylene) fabric screen available from Stern & Stern Textile, Inc. of Hornell, N.Y.; Toray carbon paper is a carbon paper prepared with polymer fibers and available from Toray Industries of Tokyo, Japan; T54-2G, T162-42, and T250-58 cloths are poly(tetrafluoroethylene) woven fabric screens available from Stern & Stern Textile, Inc. of Hornell, N.Y.

EXAMPLE 1

| Anode: | 10 wt % Pt/Vulcan on PC206 carbon powder |
|---|---|
| Cathode: | Vulcan on PC206 carbon paper |
| Electrolyte: | Anhydrous KF.2HF |
| Separator: | T216-38 natural Teflon cloth, 9 mil thick |
| Gasket: | 15 mil PTFE each on anode and cathode with 2 mil face gasket on each side thereof |

The cell package consisted of cathode gasket, cathode electrode, face gasket, separator soaked in molten KF.2HF electrolyte, face gasket, anode electrode, and anode gasket. The cell package was placed on the test stand. The cell bolts were coated with Teflon shrink tubing and Teflon washers were placerd on each side to avoid a short circuit between the anode and cathode plates. The bolts were tightened equally with a torque wrench. The cell was purged with $N_2$ and then heated to 70° C. by external heating pads attached to the copper plates. At a stable cell temperature, $H_2$ on the anode and 10% $F_2$ in $N_2$ on the cathode side were metered through the flow meters. The open circuit of the first cell was as high as 1.0 V, which was about one third less than the theoretical value. Despite the low open circuit, an effort was made to operate the cell on load. The 0.5 mA/cm$^2$ maximum current density was attained at 300 mV potential. The test was terminated, as there was no sign of performance improvements. The cell package showed pin holes on both sides of the electrodes due to overtightening of the cell bolts.

EXAMPLE 2

| | |
|---|---|
| Anode: | 10 wt % Pt/Vulcan on TORAY carbon paper |
| Cathode: | Vulcan on TORAY carbon paper |
| Electrolyte: | Anhydrous KF.2HF |
| Separator: | T250-58 natural teflon cloth, 25 mil thick |
| Gasket: | 20 mil PTFE each on anode and cathode with 2 mil face gasket on each side |

The cell package was put together in the same manner as described in Example 1. The cell was hot pressed at 80° C. in a Carver press at minimum pressure. The cell package was placed on the test stand and bolts were tightened to 30 lbs/in$^2$. $N_2$ was purged through the anode and cathode side, then the cell was heated to 67° C. An open circuit of 1.63 volt was attained when $H_2$ and $F_2$ flowed through the anode and cathode side, respectively. The cell could not draw more than 3 mA current at 500 mV potential. On increasing the cell temperature to 75° C., the performance decay was drastic. The test was continued for about 2 hours and then terminated when the performance did not improve upon decreasing the cell temperature back to 67° C. The cell package showed 4 pin field impressions on the back side of the electrodes, but no pin holes. The compactness and tightness of the cell package indicated no crossover, i.e. no reactant leaks from the seal of the electrode assembly nor diffusion of reactant gases through the electrode.

Although the performance of the cells of Examples 1 and 2 was poor, they both did operate.

EXAMPLE 3

| | |
|---|---|
| Anode: | 10 wt % Pt/Vulcan on TORAY carbon paper |
| Cathode: | Vulcan on TORAY carbon paper |
| Electrolyte: | Anhydrous KF.2HF |
| Separator: | T250-58 natural Teflon cloth, 25 mil thick |
| Gasket: | 20 mil PTFE each on anode and cathode, and 2 mil face gasket on each side |

The cell package was prepared as described in Example 1, with the basic difference that the electrolyte was spread on both sides of the separator. The cell package was not hot pressed. The cell was placed on the test stand horizontally instead of vertically to avoid the dripping of molten electrolyte from the cell. The $H_2$ and $F_2$ flows were started at room temperature after the cell was purged with $N_2$. When the open circuit was above 1.0 volt, the cell was operated on load. The current improved slowly from 0.2 mA to 6mA at 0.5 volt constant potential. The cell temperature also increased from 22° to 27° C. due to heat of reaction between $H_2$ and $F_2$. The cell temperature was increased slowly to 70°–75° C. at a 0.5 volt constant potential. The results presented in FIGS. 3 and 4 show the polarization scan and temperature effect on the cell performance.

FIG. 3 shows the cell current at 0.5 V potential vs. temperature. The cell current increases steadily as the cell temperature increases up to the melting point of the electrolyte, approximately 65°–70° C. Above this temperature, a decrease in cell current is seen. This effect is a combination of electrolyte resistivity and electrokinetics.

The polarization scan at 71° C. cell temperature is shown in FIG. 4. The cell voltage dropped at higher current. This suggests that HF in the electrolyte evaporates faster than it is produced due to the reaction of $H_2$ and $F_2$ ions, resulting in solidification and higher resistivity of the electrolyte.

EXAMPLE 4

| | |
|---|---|
| Anode: | 10 wt % Pt/Vulcan on PC206 carbon paper |
| Cathode: | Vulcan on PC206 carbon paper |
| Electrolyte: | Anhydrous KF.2HF |
| Separator: | T250-58 natural teflon cloth, 25 mil thick |
| Gasket: | 20 mil PTFE each on anode and cathode, and 12 mil face gasket on each side |

The cell package was prepared similarly to the one described in Example 1. Electrolyte was spread on both sides of the separator. The complete cell package was hot pressed at 80° C. with 0 and 1000 lbs pressure for 5 minutes each. The test cell placed on the test stand horizontally instead of vertically to avoid the dripping of molten electrolyte from the cell. The $H_2$ and $F_2$ were started at room temperature after the cell was purged with $N_2$. When the open circuit was above 1.5 volt, the cell was operated on load at 500 mV potential until the performance stabilized. The cell was heated using electrical heating pads. Polarization scans of the test cell were performed at various temperatures. The results presented in FIG. 5 show the polarization scan and temperature effect on the cell performance. The cell was cooled down and purged with nitrogen. The same cell was started again the next day, and the performance was monitored at various temperatures and current loads. The cell performance is better at the electrolyte melting temperature which is around 70° C. The fluorine ion conductivity is higher in the molten electrolyte, which reduces the internal resistance of the cell. The open circuit was higher (1.6–1.7 V) than in the cell of Example 3. The hot pressing of the cell package before the test improved the cell compactness and eliminated crossover. FIG. 5 shows that the $H_2/F_2$ cell performance is reproducible and stable.

The post-test cell package showed no sign of pin holes. The impressions of the pin field on the back of the cathode indicates compactness of the cell package, which indicates that there was no crossover of gas flow during operation. A very small quantity of electrolyte remained on the separator.

EXAMPLE 5

| | |
|---|---|
| Anode: | 10 wt % Pt/Vulcan on PC206 carbon paper |
| Cathode: | Vulcan on PC206 carbon paper |
| Electrolyte: | Anhydrous KF.2HF |
| Separator: | T162-42 white teflon cloth, 7 mil thick |
| Gasket: | 15 mil PTFE each on anode and cathode with 2 mil face gasket on each side |

The cell package was hot pressed and placed horizontally on test stand. The only difference in this test cell than the previously described cells was the separator. A 7 mil T162-42 Teflon woven cloth was used instead of T250-58. The cell was tested with a cold pressed cell package. The polarization scan was taken at various cell temperatures. The open circuit at room temperature was about 1.1 Volt. The performance improved at higher cell temperatures, but not better than that of the cell of Example. The results are reported in FIG. 7. The specific cell resistance of the cell was about 4 ohms-cm$^2$ at 500 mV potential with 71° C. cell temperature, whereas the cell of Example 4 showed 0.5 ohms-cm at the same condition. The higher resistance could be due to the low permeability of the T162-42 separator. The permeabilities of the T162-42 and T250-58 separators are 7 and 1025 cfm, respectively. The results indicate that the separator should be as coarse as possible. Again, the results show that performance improves at higher cell temperatures.

EXAMPLE 6

| | |
|---|---|
| Anode: | 10 wt % Pt/Vulcan on TORAY carbon paper |
| Cathode: | Vulcan on TORAY carbon paper |
| Electrolyte: | Anhydrous KF.2HF |
| Separator: | T54-42G white Teflon cloth, 7 mil thick |
| Gasket: | 12 mil PTFE each on anode and cathode, and 2 mil face gasket on each side |

The electrolyte was spread on one side of separator and then cold pressed. The anode and cathode electrodes were wet with isopropanol and water in a 1:1 ratio. The electrolyte, KF.2HF dissolved in water, was spread on the electrodes and then the electrodes were allowed to dry. The cell package was prepared as usual, but without pressing, and then placed on the test stand horizontally. The separator, T54-42G, is a blend of 70% Teflon and 30% cotton, with a gas permeability of 881 cfm. The $H_2$ and $F_2$ were started at room temperature after purging the cell with $N_2$. The open circuit at room temperature was 1.8 volt. The cell attained 60 mA current at 700 mV (iR corrected) potential at room temperature. Polarization scans were taken at three different cell temperatures: 25°, 35°, and 50° C.

The cell performance at 35° C. was 150–200 mV higher than the room temperature cell performance. The bolts were tightened during cell heating. The cell performance at 50° C. showed no further improvements than at 35° C. The post-test cell package showed pin holes due to over-tightening of the bolts.

The test results of the cell of Example 6 are presented in FIG. 8. This cell was built slightly differently than the cells of Examples 1–5 in that the anode and cathode electrodes were wetted with electrolyte before the cell package was assembled. At the start of the reactants, the open circuit at room temperature was 1.8 V, which was higher than the cells of Examples 1–5. The performance at 35° C. was 200 mV higher than at 25° C. The same trend did not follow at 50° C. because of pin holes in the cell package due to over-tightening of the cell bolts.

EXAMPLE 7

| | |
|---|---|
| Anode: | 10 wt % Pt/Vulcan on PC206 carbon paper |
| Cathode: | Vulcan on PC206 carbon paper |
| Electrolyte: | Anhydrous KF.2HF |
| Separator: | T216-38 natural teflon cloth, 7 mil thick |
| Gasket: | 12 mil PTFE each on anode and cathode, and 2 mil face gasket on each side |

The electrolyte was spread on one side of separator and then cold pressed at 20,000 lbs. The anode and cathode electrodes were wetted with isopropanol and water in a 1:1 ratio. The electrolyte, KF.2HF dissolved in water, was spread on the electrodes and then the electrodes were allowed to dry. The cell package was prepared as in the previous Examples but without pressing, and then placed on the test stand horizontally. The face gasket was cut with an 8 cm² circular opening instead of a 5×5 cm square cut to seal the electrode and electrolyte cell package. The electrodes and separator were cut to 6×6 cm square size. Upon introduction of $H_2$ and $F_2$ into the cell, the open circuit was 1.8 volts. The cell performance was allowed to stabilize at room temperature. The polarization scan data recorded at different temperatures, are presented in FIG. 9.

The electrode surface area was reduced to 8 cm² instead of 25 cm². In most of the previous cells, it is believed the electrodes were not wetted completely with electrolyte. The current density of the cell calculated on the basis of 25 cm² active surface area may not be the true current density. During the electrode wetting procedure, it was observed that only part of the electrode area or just barely the upper most surface of the electrodes seemed to be wetted with electrolyte. The results of the cells of Examples 6 and 7 show that higher current could be attained only if the electrodes are properly wetted with electrolyte.

What is claimed is:

1. A power generating system comprising a source of hydrogen, a source of fluorine, an electrode assembly including a fluorine cathode, a hydrogen anode, and an electrolyte layer disposed between the cathode and anode, wherein the electrolyte layer comprises KF.xHF and x is at least about 1.

2. The system of claim 1, wherein the KF.xHF is disposed in a porous separator member.

3. The system of claim 1, wherein the electrolyte comprises KF.xHF, wherein x is about 2 to about 8.

4. The system of claim 1, wherein the separator member is a poly(tetrafluoroethylene) cloth.

5. The system of claim 1, wherein the hydrogen anode comprises an electrocatalytic metal selected from the group consisting of platinum, silver, steel, and nickel, and the fluorine cathode comprises a second electrocatalyst selected from the group consisting of non-graphitized carbon powder, graphitized carbon paper.

6. The system of claim 5, wherein at least one of the electrocatalysts is disposed on a substrate selected from the group consisting of carbon fiber paper, nickel expanded metal, graphite cloth, graphite felt, woven wire cloth, and porous polymer.

7. The system of claim 1, wherein its weight is 10 Kg or less for a 2.2 kW system able to operate for 1 hour.

8. The system of claim 1, wherein the system is a fuel cell system.

9. The system of claim 1 wherein the system is a battery.

10. A method of generating power comprising the steps of (1) reacting $H_2$ with $F_2$ in the presence of an electrolyte layer comprising KF.xHF wherein x is at least about 1 impregnated in a porous separator material so as to generate heat, thereby melting the electrolyte layer; (2) electroreducing fluorine at a fluorine cathode to produce fluoride ions; (3) transporting the fluoride ions across the electrolyte layer; and (4) reacting the fluoride ions with hydrogen at a hydrogen anode to produce hydrogen fluoride and power.

11. The method of claim 10, wherein the cell produces power at temperatures of from about −10° to 250° C.

12. The method of claim 10, wherein the power generated is at least about 2.0 volts.

13. The method of claim 10, wherein x is about 2 to about 8.

14. The method of claim 10, wherein x is about 2 to about 5.

* * * * *

UNITED STATES PATENT AND TRADEMARK OFFICE
CERTIFICATE OF CORRECTION

PATENT NO. : 5,607,784

DATED : March 4, 1997

INVENTOR(S) : Jalan et al.

It is certified that error appears in the above-indentified patent and that said Letters Patent is hereby corrected as shown below:

In the Claims:

Col. 10, Claim 3: Delete "1" and insert -- 2 --

Col. 10, Claim 4: Delete "1" and insert -- 2 --

Signed and Sealed this

Twenty-seventh Day of May, 1997

Attest:

BRUCE LEHMAN

*Attesting Officer*   *Commissioner of Patents and Trademarks*